United States Patent [19]
Wilkins et al.
[11] Patent Number: 4,581,824
[45] Date of Patent: Apr. 15, 1986

[54] PORTABLE ADJUSTABLE WASHER CUTTER AND IMPROVED WASHER

[75] Inventors: Timothy A. Wilkins, Studio City; Sammy W. Leu, Tujunga, both of Calif.
[73] Assignee: PSI Telecommunications, Burbank, Calif.

[21] Appl. No.: 609,208
[22] Filed: May 11, 1984
[51] Int. Cl.[4] .......................... B26D 7/26; B26D 1/36; F16L 21/02
[52] U.S. Cl. .......................................... 30/310; 83/490; 277/215; 285/3; 408/189; 138/108
[58] Field of Search .................... 30/300, 310; 83/490, 83/565; 408/187, 186, 159, 189; 403/372; 285/3, 4; 277/215 R, 207 R, 211; 138/108

[56] References Cited

U.S. PATENT DOCUMENTS 572,320 12/1896 Stuparich .............................. 83/565
1,299,688 4/1919 DeLong .............................. 408/189
2,536,292 1/1951 Kollsman ........................ 277/215 X
3,032,062 5/1962 Blahnik ........................... 277/211 X
3,605,251 9/1971 Salerno .................................. 285/3
3,994,194 11/1976 Moceri ................................ 30/310
4,060,893 12/1977 Matsuura ............................. 30/310
4,173,913 11/1979 Nicholson ......................... 30/310 X

*Primary Examiner*—Jimmy C. Peters
*Attorney, Agent, or Firm*—Spensley, Horn, Jubas & Lubitz

[57] ABSTRACT

A portable adjustable washer cutter and improved sealing washer blank useful in telecommunications applications are described. The cutter comprises an essentially flat frame carrying a rotatable shaft and a platform placed opposite thereto for mounting a sealing washer blank in which a desired central opening is to be cut. An improved sealing washer blank having a small central opening and a small opening along its periphery can be easily mounted on the cutter by insertion of protruding members on the cutter through these openings. The sealing washer blank is cut by means of a blade mounted on a member attached to the bottom of the shaft. In a preferred embodiment, the sealing washer blank is provided with concentric annular ribs, the sealing washer blank being cut at a position between ribs.

15 Claims, 8 Drawing Figures

PORTABLE ADJUSTABLE WASHER CUTTER AND IMPROVED WASHER

BACKGROUND OF THE INVENTION

1. Field of the Invention

This invention relates to the field of telecommunication cable closures, and in particular to a sealing washer used with such closures and to a device for providing the required opening in such washers to accommodate telecommunication cables of various sizes.

2. Prior Art

In the telecommunications field, it becomes necessary to join telecommunications cables together at various points. Where this is accomplished by splicing the cables together, it is preferred to enclose the spliced connection within a sealed closure in order to protect the connection from moisture and other environmental factors. The telecommunications cable closures used in the field may be cylindrical in shape and provided with end plates having circular openings through which the telecommunications cables are introduced into the closure. Since the telecommunications cables introduced into the closures may be of various diameters, circular sealing washers whose purpose is partly to locate the cable in the center of the end plate as well as to seal the closure are disposed in circumferential grooves in the end plate openings. The end plates are fabricated in semicircular sections which close together around the sealing washer in clamshell like manner. The sealing washers therefore have an outside diameter equal to the diameter of the circumferential groove and an inside diameter equal to the diameter of the telecommunications cable being inserted through the end plates.

Two sealing washers are typically used, one on each side of the end plate. Between the sealing washers an uncured rubber sealing tape is wrapped around the telecommunications cable. The sealing washers prevent this uncured rubber tape from oozing out of the cavity in the end plate between the two sealing washers after the end plate is assembled. This arrangement of uncured rubber sealing tape, sealing washers, telecommunications cable and end plate have been found to provide a satisfactory closure for protecting spliced connections from moisture and other environmental factors where the telecommunications cable is introduced into the closure.

As the spliced connections and telecommunications closures referred to are often located in the field, they may be located in underground conduits accessible only through manhole covers, or near the tops of utility poles. If, during the course of installation or repair of spliced connections, a telecommunications repair person has not brought with him or her a particular sealing washer having an opening suitably sized to accommodate the particular telecommunications cable used, such person will be inconvenienced at having to return to his or her truck or work station in order to retrieve an appropriately sized sealing washer. Even greater inconvenience and loss of time results if in fact the repair person does not have an appropriate sealing washer in his or her truck or at his or her work station and must return to a supply depot in order to obtain the appropriate sealing washer. It will be appreciated, therefore, that it is advantageous to be able to fabricate a sealing washer having the appropriate opening in it in the field from a sealing washer blank.

Previously known sealing washers comprised an essentially solid disk of uniform thickness, often having a radial slot which might or might not extend all the way through the thickness of the sealing washer. The radial slot enables the sealing washer fabricated from the blank to be separated at the slot so that it can be twisted and inserted over a cable rather than slipped on over the end of the cable.

Prior to the present invention, the only known devices which have been used in the field in order to obtain sealing washers having appropriately sized openings have suffered from one or more shortcomings. One device, Western Electric No. 849A Sealing Washer Cutter, has a hinged mechanism for clamping one size of sealing washer blank on a table and a rotatable central shaft having a plate attached thereto to which movable blades for cutting the washer are attached. This device, of metal construction, is bulky and heavy and not suitable for carrying to all in-field locations. In particular, it is not believed that it was designed to be used or could safely be used by a repair person on a utility pole.

Another known device for providing appropriately sized sealing washers in the field is of West German origin and has been sold under the name "Krone". This device also includes a hinged mechanism and platform for clamping a sealing washer blank of a specified size and a rotatable shaft which is attached to a bladecarrying arm. This device is light in weight, but somewhat bulky. In addition, its blade is not easily adjustable.

Another device for cutting sealing washers is the WCT 10 of PSI Telco. This device is versatile in that it can fabricate sealing washers having specified outside as well as inside diameters. The device is comprised of a table having steps, an adjustable clamping mechanism for holding the sealing washers, and an adjustable rotatable blade. While light in weight, it is, nonetheless, bulky.

The cutting device of the present invention provides features which are not provided in any of the above discussed devices. With the portable adjustable washer cutter of the present invention, a repair person in the field, even atop a utility pole, may easily and quickly fabricate a sealing washer having a required inside diameter from a sealing washer blank. The cutter is both lightweight and compact, and can be disposed in an essentially flat pack or pocket, unlike the heretofore known cutting devices. This is accomplished in part through the use of an improved sealing washer blank having a ribbed construction and a pair of mounting holes for use in positioning the sealing washer blank on the cutter. By the use of the mounting holes in the sealing washer blank and corresponding mating pins on the cutter, the cutter dispenses with the use of a support platform around the circumference of the sealing washer blank as well as any clamping features which have characterized the heretofore known cutting devices. The ribbed construction permits the sealing washers blanks to be thinner where they are cut by the cutter than the sealing washer blanks previously used.

BRIEF SUMMARY OF THE INVENTION

It is an object of the present invention to provide a sealing washer fabrication tool that is lightweight and portable, and therefore capable of being used at almost any conceivable field position by persons installing or servicing telecommunications cables in the field, including by persons atop utility poles. A related object of the present invention is to provide a sealing washer fabrication tool that is not only lightweight and portable, but also can be carried in an essentially flat pack or pocket, unlike the bulky devices heretofore known. Another object of the present invention is to reduce the inefficiency resulting from the unavailability of sealing washers having properly sized central openings at field locations, and to do so by providing a device and a sealing washer blank which can be used to fabricate the desired sealing washer by easily and quickly cutting a properly sized central opening in a sealing washer blank at the field location.

To achieve these objectives, the present invention provides a cutting tool having an integral, essentially uniplanar molded plastic frame. One portion of the frame is a first cylindrical tubular section in which a rotatable shaft may turn. The rotatable shaft is provided at one end with a handle extending in both directions radially with respect to the axis of the shaft and at the other end with a blade-carrying member which slides through an opening in the shaft in a radial direction. The blade is located near the end of the blade-carrying member and may be positioned radially with respect to the axis of the shaft by movement of the blade-carrying member within the opening of the shaft.

A second cylindrical tubular portion of the frame opposite the first cylindrical tubular portion but concentric with the axis of the shaft and spaced apart from the first cylindrical tubular portion is used for mounting the sealing washer blank to be cut. This portion also comprises an essentially tubular section. A metal, essentially cylindrical insert is inserted thereon during the molding of the plastic frame. The tubular section and insert are aligned with the axis of the shaft. The insert, which extends above the tubular section has, at its top opposite the first cylindrical tubular section holding the shaft, a small annular platform having a central raised portion. The central raised portion corresponds to a central opening in the sealing washer blank so that the sealing washer blank may be inserted onto the annular platform and located there by placement of the central opening in the sealing washer blank over the central raised portion.

A radial opening beneath the annular platform carries a linear member which is movable radially with respect to the axis of the shaft. Located near the end of the linear member is a pin protruding upwardly in a direction parallel to the axis. This pin is sized to be inserted into a small opening located in the periphery of the sealing washer blank. The sealing washer blank is therefore inserted on the cutting tool by insertion of the opening in the periphery of the sealing washer blank over the pin and the central opening in the sealing washer blank over the central raised portion on the annular platform. By sliding the linear member and consequently moving the pin radially sealing washer blanks of any outside diameter may be positioned on the cutting device.

Beneath the second cylindrical tubular portion the integral frame has a portion extending radially with respect to the axis in both directions, by which the cutting tool may be grasped while being used. A connecting portion of the frame connects this handle portion to the first cylindrical tubular portion to complete the integral frame. By such construction, the washer cutter of the present invention is of a lightweight, compact and sturdy construction.

As previously mentioned, the sealing washer blanks are provided with a central opening as well as an opening along the periphery in order to mount the sealing washer blanks on the cutter. Although not required for use with the cutter of the present invention, a number of other special features are provided in the sealing washer blank which has been especially developed for use with the cutter.

The sealing washer blank of the present invention has an annular peripheral portion of approximately the same thickness as the prior art sealing washer blanks so that the fabricated sealing washer may be inserted into a groove of the end plate. However, in order to enable the sealing washer to be easily cut by the washer cutter, the thickness of the sealing washer blank interior to that of the annular peripheral portion is significantly less than that of the annular peripheral portion of the prior art sealing washer blanks. In the preferred embodiment the thickness increases in small steps as the central opening is approached from the periphery.

To increase the strength and rigidity of the sealing washer blank the sealing washer blank is provided with an array of concentric annular ribs in the region interior to the annular peripheral portion. In the preferred embodiment, the annular concentric ribs may be of a height so that the sealing washer blank thickness measured at those ribs is equal to the thickness of the sealing washer blank at the annular peripheral portion.

The sealing washer blank has a widened radial rib which is of the height of the annual peripheral portion and the concentric annual ribs. This radial rib is of sufficient width to accommodate a linear array of small equally spaced openings which penetrate it, the openings being located at radial positions which are between the locations of the concentric annular ribs. When such a sealing washer blank is positioned on the washer cutter, the blade is first aligned with and inserted through one of these small openings and the circular cut made in the sealing washer is begun from such point so that the sealing washer is actually cut at a radial position located between the concentric annular ribs, i.e., where the sealing washer is of a thickness significantly less than the annular peripheral region of the sealing washer.

In order to increase the rigidity of the sealing washer blank, other radial ribs, as well as the previously mentioned annular ribs are provided. In the preferred embodiment, radial ribs of a height less than the thickness of the sealing washer blank in the annular peripheral portion are located at approximately 45 degree intervals measured from the previously discussed widened radial rib. In addition, a pair of tin radial ribs of a height equal to the annular peripheral portion are located one on each side of the widened radial rib and approximately 20 degrees from it.

With this construction, the sealing washer fabricated from such a sealing washer blank is strong and rigid enough to withstand the pressure exerted on it by the end plate and the uncured rubber sealing tape.

To fabricate a sealing washer from a sealing washer blank, a sealing washer blank is inserted onto the cutting device by insertion of the small peripheral opening and the central opening in the blank over the pin on the linear member and the central raised portion respectively, the ribbed side of the sealing washer blank facing away from the cylindrical tubular section and toward the pin and annular platform. The blade-carrying member is then slid within the opening in the shaft until the blade is located at the radius at which it is desired to cut the sealing washer blank, the blade thereupon being inserted into the appropriate small opening along the widened radial rib corresponding to the radius at which the sealing washer blank is to be cut.

Thereafter, the handle at the end of the shaft and the handle portion beneath the annular platform are rotated relative to one another while a force tending to press them together is exerted so that the cutting blade cuts through the sealing washer blank to produce the desired diameter cut.

The novel features which are believed to be characteristic of the invention, both as to its configuration and method of operation, together with further objectives and advantages thereof, will be better understood from the following description considered in connection with the accompanying drawings in which a presently preferred embodiment of the invention is illustrated by way of example. It is to be expressly understood, however, that the drawings and the preferred embodiment are for the purpose of illustration only and are not intended as a definition of the limits of the invention.

DESCRIPTION OF THE PREFERRED EMBODIMENT

Figure 1:
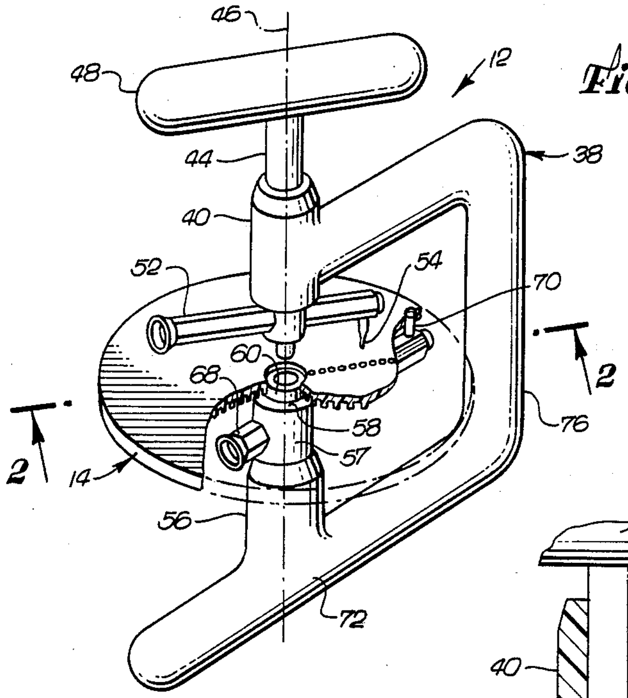
FIG. 1 is a perspective view of a preferred embodiment of the portable adjustable washer cutter with a sealing washer blank (partially cut away) mounted thereon.
Figure 2:
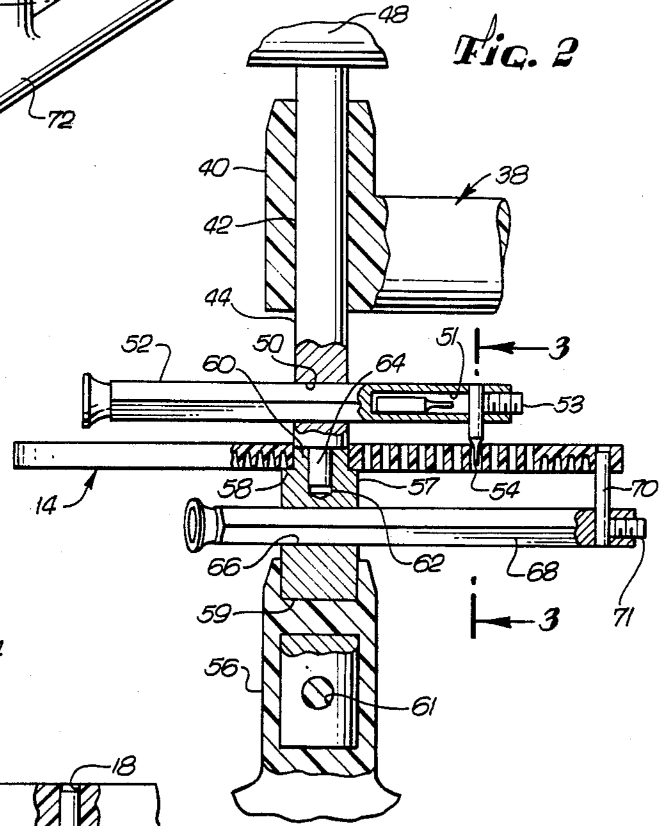
FIG. 2 is a partial sectional view taken along the lines 2—2 of FIG. 1.
Figure 3:
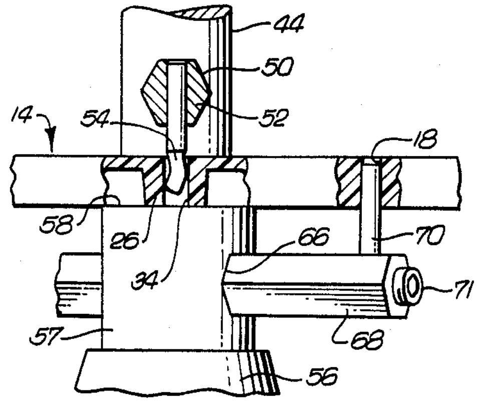
FIG. 3 is a sectional view taken along the lines 3—3 of FIG. 2.
Figure 4:
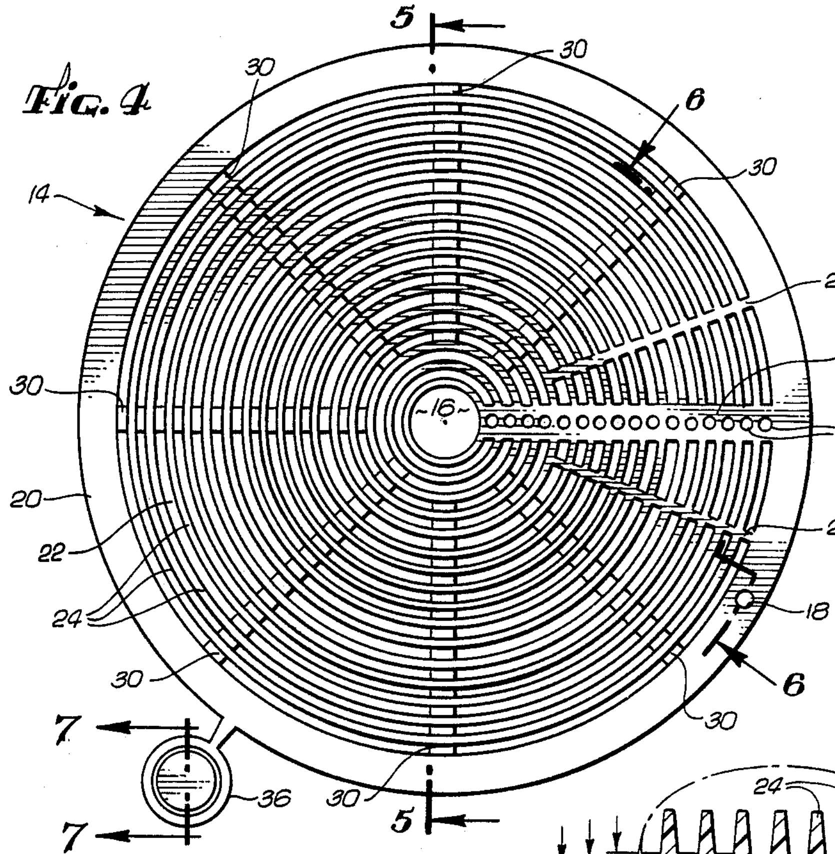
FIG. 4 is a plan view of a preferred embodiment of a sealing washer blank.
Figure 5:
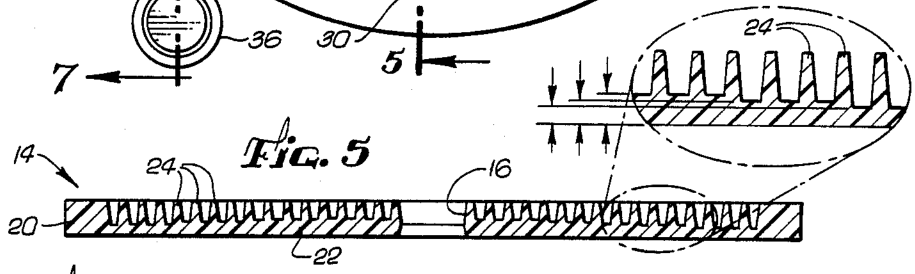
FIG. 5 is a sectional view taken along the lines 5—5 of FIG. 4, with a portion thereof shown in magnified view.
Figure 6:
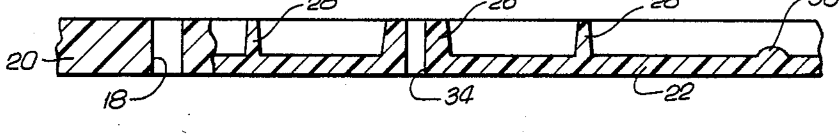
FIG. 6 is a sectional view taken along the lines 6—6 of FIG. 4.
Figure 8:
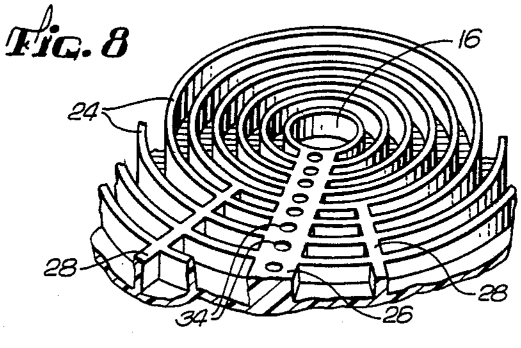
FIG. 8 is a partial perspective and sectional view of a portion of the sealing washer blank shown in FIG. 4.
Figure 7:
FIG. 7 is a sectional view of the plug of the sealing washer blank taken along the lines 7—7 of FIG. 4.

The preferred embodiment of the portable adjustable washer cutter 12 of the present invention is shown in FIGS. 1 through 3 while a sealing washer blank 14 especially developed to be used with the washer cutter 12 is shown in FIGS. 4 though 8.

The sealing washer blank 14 is a disc-shaped blank of flexible plastic or other similar material having a ribbed construction on one side. In the preferred embodiment described herein, sealing washer blank 14 has a central opening 16 and a small peripheral opening 18 which are used in mounting the sealing washer blank 14 on washer cutter 12 as will be described.

The central opening 16 is slightly larger at the bottom, i.e., the flat side of the sealing washer blank 14, so that a small plug 36 molded as an integral part of the sealing washer blank 14 may be snapped off and inserted therein. Small plug 36 is of generally cylindrical shape with an outward taper at one end corresponding to the increased diameter of the central opening 16 at the bottom side of the sealing washer blank 14. Small plug 36 is used in the event that the sealing washer blank 14 is disposed in an end plate through which no telecommunication cable is inserted and it is therefore desired to blank off the end plate using a sealing washer blank 14. Since the ribbed side of the sealing washer blank is inserted into the end plate so that it faces outward or away from the end plate, the small plug 36 is pushed into the central opening 16 by uncured rubber sealing tape or other material placed in the cavity in the end plate between the sealing washers.

Sealing washing blank 14 has an annular peripheral region 20 of uniform thickness. The thickness of peripheral region 20 is the same as the thickness of typical prior art sealing washer blanks, the peripheral region 20 of a sealing washer fabricated from a sealing washer blank 14 for placement within a circumferential groove located in an end plate for a telecommunications closure.

The region 22 interior to the annular peripheral region 20 has a base thickness which is a fraction of the thickness of the peripheral region 20. The purpose of having the base thickness of the interior region 22 significantly less than the thickness of the peripheral region 20 is to facilitate the cutting of the sealing washer blank 14. The thickness of the interior region 22 increases in small increments from the annular peripheral region 20 to the central opening 16. In the preferred embodiement, there are four such increments, each increment being 0.010 inches. However, as sealing washers can be subjected to considerable force when the end plate is clamped together around a telecommunications cable, the end plate tending to force the uncured rubber sealing tape outward against the sealing washers, it is necessary or desirable to increase the strength and rigidity of the sealing washers beyond what is provided by this incremental thickening of the interior region 22. Sealing washer blank 14 is therefore fabricated with a number of upstanding annular ribs 24 and radial ribs 26, 28 and 30.

Annular ribs 24 are equally spaced and concentric, beginning at the central opening 16 and extending to the annular peripheral region 20. In the preferred embodiment, annular ribs 24 extend to the height of the annular peripheral region 20.

A widened radial rib 26 extends from the central opening 16 to the annular peripheral region 20 of sealing washer blank 14, its height being equal to the height of the annular ribs 24 which intersect it. Along rib 26 is located a linear array of equally spaced small openings 34. Radially, these small openings 34 are located between adjacent annular ribs 24. As will be described, the blade of the washer cutter is initially inserted into one of the small openings 34 to cut the sealing washer blank 14.

A pair of radial ribs 28 is located approximately 20 degrees from the rib 26, one of the radial ribs 28 of the pair located on each side of the rib 26. The purpose of these ribs is to increase the rigidity of the sealing washer. In addition, radial ribs 30, which have a height less than that of the radial ribs 26 and 28 and the annular ribs 24 are located at approximately 45 degree intervals from the radial rib 26 around the sealing washer blank 14.

The sealing washer blank 14 described above has been especially developed to be cut by the portable adjustable washer cutter 12 which will now be described in a preferred embodiment with reference especially to FIGS. 1 through 3. The washer cutter 12 of the present invention has an integral, essentially uniplaner frame, preferably molded from a single piece of plastic. Frame 38 will be described herein in terms of the different functional portions comprising it and their associated components. The first cylindrical tubular portion 40 of frame 38 contains a cylindrical bore the surface of which forms a bearing 42 in which a shaft 44, preferably fabricated of metal, may rotate defining an axis 46. At its first or top end, shaft 44 is provided with a handle 48 comprised of a linear member which extends radially with respect to the axis 46 in both directions. As used herein, "top" and "bottom" and "up" and "down" refer to the top and bottom of the drawings in FIGS. 1 through 3. The use of such words should not be understood as limiting the portable adjustable washer cutter 12 with respect to its orientation in space when in use or not in use. In fact, the portable adjustable washer cutter 12 may be used in virtually any orientation. By means of handle 48, shaft 44 may be rotated about axis 46 in bearing 42 as well as moved axially up and down within bearing 42.

Located near the lower or second end of shaft 44 is a radial opening 50 through shaft 44 in which blade-carrying member 52 may slide. Blade-carrying member 52 is a linear member having a cross section the same as the cross section of the radial opening 50. These cross sections are such that blade-carrying member 52 is permitted to slide in a radial direction within radial opening 50 but cannot rotate about an axis situated along any radius of shaft 44. Blade 54 is mounted near one end of blade-carrying member 52 and extends in a downward direction, i.e., in a direction away from the top of the shaft 44. Blade 54 may therefore be positioned at any desired radial position with respect to the axis 46 by sliding the blade-carrying member 52 within radial opening 50.

Blade 54 is secured by screw 53. Blade-carrying member 52 is provided with a cavity 51 accessible through the hole for screw 53. Cavity 51 may be conveniently used to store extra blades.

The second cylindrical tubular portion 56 of frame 38 is located opposite the first cylindrical tubular portion 40 beneath and separated from the bottom or second end of shaft 44 so that its tubular section is coaxial with respect to axis 46, and extends beyond the end of the second cylindrical tubular portion 56 towards first cylindrical tubular portion 40. Insert 57, in the preferred embodiment, contains, at its lower end, two radial openings 59 and 61 axially separated and at right angles to one another. Openings 59 and 61 are used in attaching insert 57 to the second cylindrical tubular portion 56 of frame 38. Insert 57 is placed in the mold used to fabricate the frame 38 so that during the molding process plastic material fills the radial openings 59 and 61. By this procedure, insert 57 is securely and permanently attached to second cylindrical tubular portion 56 of frame 38.

At the top of insert 57 is a small annular platform 58 surrounding a circular central raised portion 60, both of which are coaxial with respect to axis 46. The diameter of the circular cental raised portion 60 is nominally equal to the diameter of the central opening 16 of the sealing washer blank 14. A small cylindrical bore 62 is located in the top of circular central raised portion 60 and is centered about axis 46. Small cylindrical bore 62 is sized to accommodate small cylindrical pin 64 situated at the second or bottom end of shaft 44 and also centered about axis 46. Small cylindrical bore 62 assists in guiding shaft 44 when rotated so that shaft 44, when rotated, is not deviated from axis 46 when the blade 54 is cutting a sealing washer blank 14.

Beneath small annular platform 58 in insert 57 is located radial opening 66 oriented in a direction radial with respect to axis 46. Linear member 68 which has the same cross section as radial opening 66 slides within radial opening 66. These cross sections are configured so that linear member 68 does not rotate within radial opening 66.

A small cylindrical pin 70 is mounted near the end of linear member 68 using screw 71. Cylindrical pin 70 points upward, i.e., in the direction toward the top or first end of shaft 44. The top of cylindrical pin 70 is at approximately the same height as the top of the circular central raised portion 60. By sliding linear member 68 in the radial opening 66, cylindrical pin 70 may be positioned at different radial positions with respect to axis 46. Cylindrical pin 70 is of the same nominal diameter as the small peripheral opening 18 of sealing washer blank 14. Linear member 68 and cylindrical pin 70 assist in the mounting of sealing washer blanks 14 on the washer cutter 12, as will be described.

At the bottom of second cylindrical tubular portion 56 of frame 38 is handle portion 72 of frame 38. Handle portion 72 extends in opposite directions from axis 46 and is parallel to linear member 68 and the line along which linear member 68 slides within radial opening 66. The space between linear member 68 and handle portion 72 is sufficient to permit the fingers of a hand of a person operating the portable adjustable washer cutter to be positioned around the handle portion 72.

A connecting portion 76 of frame 38 joins the handle portion 72 to the first cylindrical tubular portion 40 to complete the integral frame 38.

The portable adjustable washer cutter 12 can be used to cut openings of virtually any required diameter in sealing washer blanks 14, which themselves may be of a variety of diameters. To use the portable adjustable washer cutter 12 to fabricate an opening in a sealing washer blank 14, the sealing washer blank 14 is mounted on insert 57 in second cylindrical tubular portion 56 by placing the small peripheral opening 18 in the annular peripheral region 20 of sealing washer blank 14 over the cylindrical pin 70 carried by the linear member 68 with the flat side of the sealing washer blank 14 facing up, i.e., in a direction toward the top of shaft 44. Linear member 68 is slid within radial opening 66 so that the central opening 16 of sealing washer blank 14 can be placed over the circular central raised portion 60 with the area of the sealing washer blank 14 adjacent central opening 16 resting on the small annular platform 58. By this means, sealing washer blank 14 is mounted on the portable adjustable washer cutter 12.

Blade 54 is positioned at a radial position corresponding to that at which the sealing washer blank 14 is to be cut by sliding blade-carrying member 52 in radial opening 50. Blade 54 is brought into contact with sealing washer blank 14 by axial movement of the shaft 44 in the bearing 42 by means of handle 48 and aligned with one of the small openings 34 in rib 26 by appropriate rotation of shaft 44 in bearing 42 using handle 48.

The tip of blade 54 is pressed through the small opening 34 located at the radius at which the sealing washer blank 14 is to be cut by exerting a force which tends to press handle 48 and handle portion 72 toward one another. A repair person then may effect a circular cut in the sealing washer blank 14 by grasping the handle 48 with one hand and the handle portion 72 of frame 38 with the other hand and rotating them with respect to one another while exerting a force tending to press them together. Since the sealing washer blank 14 is cut at a radial position corresponding to a small opening 34, and consequently at a position between adjacent annular ribs 24, such a cut can be quite easily made.

After a relative rotation of handle 48 and handle portion 72 of 360 degrees, an opening to accommodate the desired telecommunications cable has been cut into the sealing washer blank 14. If the cut has not penetrated all of the radial ribs 26, 28 and 30 completely, the cutout central portion of the sealing washer blank 14 may simply be pressed out after removal of the now cut sealing washer blank 14 from the adjustable portable washer cutter 12. The cutout central portion may be discarded, the small plug 36 snapped off, and the washer inserted over the end of a telecommunications cable.

The portable adjustable washer cutter 12 of the present invention, when not in use, can be easily stored and carried in an essentially flat pack or pocket, as not only is the integral frame 38 essentially uniplaner, i.e., flat, but the insert 57, handle 48, the blade-carrying member 52, and the linear member 68 are all essentially in, or can be rotated to be essentially in the same plane. Hence, a degree of portability and utility previously unknown is provided.

Even though a presently preferred embodiment of the present invention has been described with respect to a specific configuration, there are many other configurations and variations that are within the scope of the present invention. For example, it may be preferred to use a threaded shaft and a corresponding threaded first cylindrical tubular portion rather than the bearing 42 and the cylindrical shaft 44 which have been described. This might be especially useful when sealing washer blanks of uniform thickness such as heretofore have been known, are used. Such sealing washer blanks would of course be provided with a central opening and one or more small peripheral opening for insertion over the circular central raised portion 60 and one or more small cylindrical pins respectively. As another alternative, it may be desired to incorporate insert 57 into the second cylindrical tubular portion 56, i.e., form these of one piece of molded plastic material. With respect to sealing washer blanks, as another embodiment the central opening 16 and the peripheral opening 18 could be replaced by indentations that do not completely penetrate the sealing washer blank.

Thus, it should be recognized that many modifications and variations not discussed herein may readily occur to those skilled in the art. Consequently, it is intended that the claims be interpreted to cover such modifications and equivalents.

What is claimed:

1. A device for cutting an opening to accommodate a telecommunications cable in a sealing washer blank made of plastic or similar material comprising:

a shaft rotable about an axis carrying a cutting blade adjustable in position radially with respect to said axis; and a frame have a bearing for said shaft and a means for holding said sealing washer blank, said means for holding comprising:

a small platform opposite to one end of said shaft and centered on said axis for supporting at least a portion of said sealing washer blank near its center in a plane perpendicular to said axis; and a member coupled to said frame provided with a small pin oriented parallel to said axis placeable through a small opening in said sealing washer blank for holding said sealing washer blank at a position near its edge.

2. A device as in claim 1 wherein said means for holding said sealing washer blank at a position near its edge comprises a small pin oriented parallel to said axis placeable through a small opening in said sealing washer blank.

3. A device as in claim 1 wherein said platform is annular and surrounds a raised portion sized to be placeable through the central opening in said blank.

4. A device as in claim 2 wherein said pin is attached to a linear member slideable coupled to said frame, said linear member slideable in a direction perpendicular to said axis to position said pin at selectable radial positions with respect to said axis.

5. A device as in claim 1 wherein said blade is mounted on a linear member slideably coupled to said shaft, said linear member slideable in a direction perpendicular to said axis to position said blade at a selectable radial position with respect to said axis.

6. A device as in claim 1 wherein said pin is attached to a linear member slideably coupled to said frame, said linear member slideable in a direction perpendicular to said axis to position said pin at selectable radial positions with respect to said axis.

7. A portable device for cutting an opening in a sealing washer blank or the like comprising:

a frame, the center line of whose portions lie essentially in a single plane, said frame comprising:

a tubular portion for carrying a shaft rotatable about an axis;

a sealing washer blank mounting portion spaced apart from said tubular portion and configured to hold a means for mounting a sealing washer blank concentric with said axis and in the plane perpendicular to said axis; and an essentially u-shaped connecting portion joining said tubular portion to said sealing washer blank mounting portion;

an axially moveable and rotatably shaft carried by said tubular portion;

a blade coupled to said shaft and adjustable in position radially with respect to said axis; and means for mounting a sealing washer blank concentric with said axis and in the plane perpendicular to said axis, said means comprising:

an annular platform concentric with said axis facing said tubular portion; and a linear member oriented and slideable along a line perpendicular to said axis and in the plane of said frame, said linear member carrying a peripheral holding means for holding a sealing washer blank at a position near the periphery of the sealing washer blank.

8. A device as in claim 7 wherein said peripheral holding means comprises:

a pin oriented parallel to said axis for placement in a correspondingly sized opening in said sealing washer blank near its periphery.

9. A sealing washer blank for use with telecommunications cable closures, said blank molded from plastic and having a central portion that may be removed by a device for cutting a central opening in said blank, said blank comprising:

a peripheral region of essentially uniform thickness;

an interior region having a base portion thinner than said peripheral region and a plurality of upstanding substantially annular concentric ribs, said interior region having a radial array of small openings in said blank interspersed radially with said substantially annular concentric ribs, said openings located radially between the locations of adjacent substantially annular concentric ribs, said openings for initial insertion of a cutting portion of a device for cutting a central opening in said blank at a radius equal to that of a selected one of said small openings.

10. A sealing washer blank as in claim 9 wherein said interior region has a plurality of upstanding radial ribs.

11. A sealing washer blank as in claim 9 further comprising:

a first means molded into said blank near its center for engaging a first holding portion of a device for cutting a central opening in said blank; and a second means molded into said blank in said perripheral region for engaging a second holding portion of a device for cutting a central opening in said blank, said first and second holding means for holding said blank so that said blank may be cut by said device for cutting.

12. A sealing washer blank as in claim 11 further comprising at least one upstanding radial rib.

13. A sealing washer blank as in claim 11 wherein said first means is a small central opening in said blank and said second means is a small hole in said peripheral region.

14. A device for cutting an opening to accommodate a telecommunications cable in a sealing washer blank made of plastic or similar material comprising:

a shaft rotatable about an axis carrying a cutting blade adjustable in position radially with respect to said to said axis; and a frame having a bearing for said shaft and a means for holding said sealing washer blank, said means for holding comprising:

a small annular platform opposite to one end of shaft and centered on said axis for supporting at least a portion of said sealing washer blank near its center in a plane perpendicular to said axis, said platform surrounding a raised portion sized to be placeable through the central opening in said blank; and a member coupled to said frame provided with a means for holding said sealing washer blank at a position near its edge.

15. A device as in claim 14 wherein said blade is mounted on a linear member slideably coupled to said shaft, said linear member slideable in a direction perpendicular to said axis to position said blade at a selectable radial position with respect to said axis.

* * * * *